(12) United States Patent
Huang

(10) Patent No.: US 12,277,291 B2
(45) Date of Patent: Apr. 15, 2025

(54) DRIVER CIRCUIT

(71) Applicant: Novatek Microelectronics Corp., Hsinchu (TW)

(72) Inventor: Kai-Chun Huang, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/460,698

(22) Filed: Sep. 5, 2023

(65) Prior Publication Data

US 2025/0077026 A1    Mar. 6, 2025

(51) Int. Cl.
     *G09G 5/00*      (2006.01)
     *G06F 3/041*     (2006.01)
     *G09G 3/20*      (2006.01)

(52) U.S. Cl.
     CPC ...... *G06F 3/04184* (2019.05); *G06F 3/04164* (2019.05); *G09G 3/2096* (2013.01); *G09G 2330/06* (2013.01)

(58) Field of Classification Search
     CPC ............ G06F 3/04184; G06F 3/04164; G09G 3/2096; G09G 2330/06
     USPC ........................................................ 345/173
     See application file for complete search history.

(56) References Cited

U.S. PATENT DOCUMENTS

| | | | |
|---|---|---|---|
| 11,573,653 B2 | 2/2023 | Tsai | |
| 11,693,518 B2 | 7/2023 | Jung et al. | |
| 2019/0272076 A1* | 9/2019 | Chen | G06F 3/0412 |
| 2019/0369773 A1* | 12/2019 | Kimura | G06F 3/04164 |
| 2020/0097115 A1 | 3/2020 | Nitobe et al. | |
| 2022/0121302 A1 | 4/2022 | Tsai | |
| 2022/0197474 A1* | 6/2022 | Kang | G06F 3/0412 |
| 2023/0134476 A1 | 5/2023 | Jung et al. | |
| 2023/0384880 A1* | 11/2023 | Huang | G06F 3/0416 |

FOREIGN PATENT DOCUMENTS

| | | |
|---|---|---|
| CN | 214409943 | 10/2021 |
| TW | 202032354 | 9/2020 |
| TW | 202046068 | 12/2020 |
| TW | 202217531 | 5/2022 |
| TW | 202318168 | 5/2023 |

OTHER PUBLICATIONS

"Office Action of Taiwan Counterpart Application", issued on Jun. 18, 2024, p. 1-p. 4.

* cited by examiner

*Primary Examiner* — Jennifer T Nguyen
(74) *Attorney, Agent, or Firm* — JCIPRNET

(57) ABSTRACT

A driver circuit configured to drive a display panel to perform a display function and a touch function is provided. The driver circuit includes a plurality of pads and a switch circuit. The plurality of pads are coupled to the display panel and grouped into several pad groups. A synchronization driving signal is applied to the pad groups in a touch sensing phase, and the synchronization driving signal has a first level. The switch circuit is coupled to the pads. The switch circuit is configured to receive a common signal and a system voltage signal, and output the common signal and the system voltage signal to the pad groups in a time division manner. The common signal has a second level, and the system voltage signal has a third level. Voltage levels of the pad groups are changed from the second level to the first level in different times, and the second level is smaller than the first level.

6 Claims, 14 Drawing Sheets

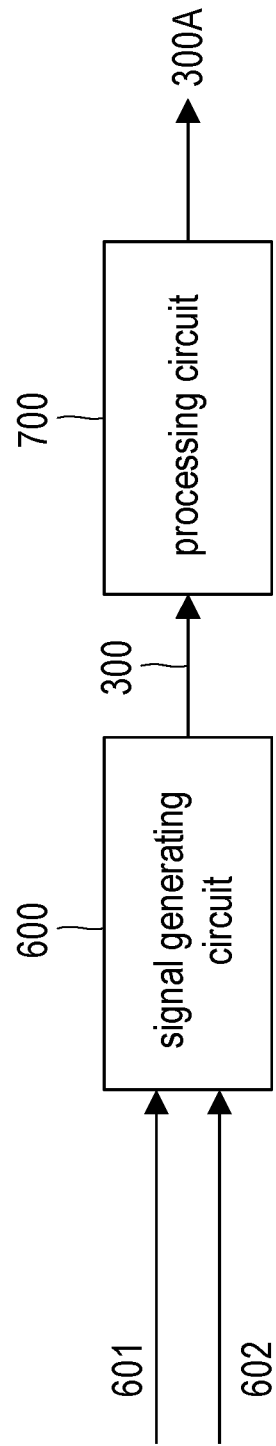

DRIVER CIRCUIT

BACKGROUND

Technical Field

The disclosure relates to a driver circuit, and more particularly to a driver circuit capable of driving a display panel to perform a display function and a touch function.

Description of Related Art

TDDI (touch with display driver) is a touch technology solution that integrates the panel driver IC and the touch panel IC into a single chip. For in-vehicle TDDI applications, the EMI test items are more stringent than those for other TDDI products due to driver safety issues. However, in related arts, most of the components of display panels need to be applied with the same signals as the touch driving signals to reduce the touch driving load, which will lead to an increase in EMI problems.

SUMMARY

The disclosure is directed to a driver circuit capable of reducing electromagnetic interference (EMI) effect when signal level changes.

The disclosure provides a driver circuit configured to drive a display panel to perform a display function and a touch function. The driver circuit includes a plurality of pads and a switch circuit. The plurality of pads are coupled to the display panel and grouped into several pad groups. A synchronization driving signal is applied to the pad groups in a touch sensing phase, and the synchronization driving signal has a first level. The switch circuit is coupled to the pads. The switch circuit is configured to receive a common signal and a system voltage signal, and output the common signal and the system voltage signal to the pad groups in a time division manner. The common signal has a second level, and the system voltage signal has a third level. Voltage levels of the pad groups are changed from the second level to the first level in different times, and the second level is smaller than the first level.

In an embodiment of the disclosure, the voltage levels of the pad groups are changed from the second level to the first level through the third level in different times. The third level is larger than the second level and smaller than the first level.

In an embodiment of the disclosure, the voltage levels of the pad groups are changed from the first level to the second level in different times.

In an embodiment of the disclosure, the voltage levels of the pad groups are changed from the first level to the second level through the third level in different times. The third level is larger than the second level and smaller than the first level.

In an embodiment of the disclosure, the first level is a positive voltage, the second level is a negative voltage, and the third level is a ground voltage.

In an embodiment of the disclosure, the pad groups are coupled to touch sensing lines, gate lines, source lines, common electrodes, or a guard ring of the display panel.

In an embodiment of the disclosure, the switch circuit includes a plurality of first switches and a plurality of second switches. The plurality of first switches are configured to receive the common signals, and output the common signals to the pad groups when the first switches are conducted. The plurality of second switches are configured to receive the system voltage signals, and output the system voltage signals to the pad groups when the second switches are conducted.

In an embodiment of the disclosure, the first switches are sequentially conducted.

In an embodiment of the disclosure, the second switches are sequentially conducted.

In an embodiment of the disclosure, the first switches and the second switches are not conducted at the same time.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 8A is a block diagram illustrating a signal generating circuit and a processing circuit according to an embodiment of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." The term "signal" can refer to a current, a voltage, a charge, a temperature, data, electromagnetic wave or any one or multiple signals. In addition, the term "and/or" can refer to "at least one of". For example, "a first signal and/or a second signal" should be interpreted as "at least one of the first signal and the second signal".

Figure 1:
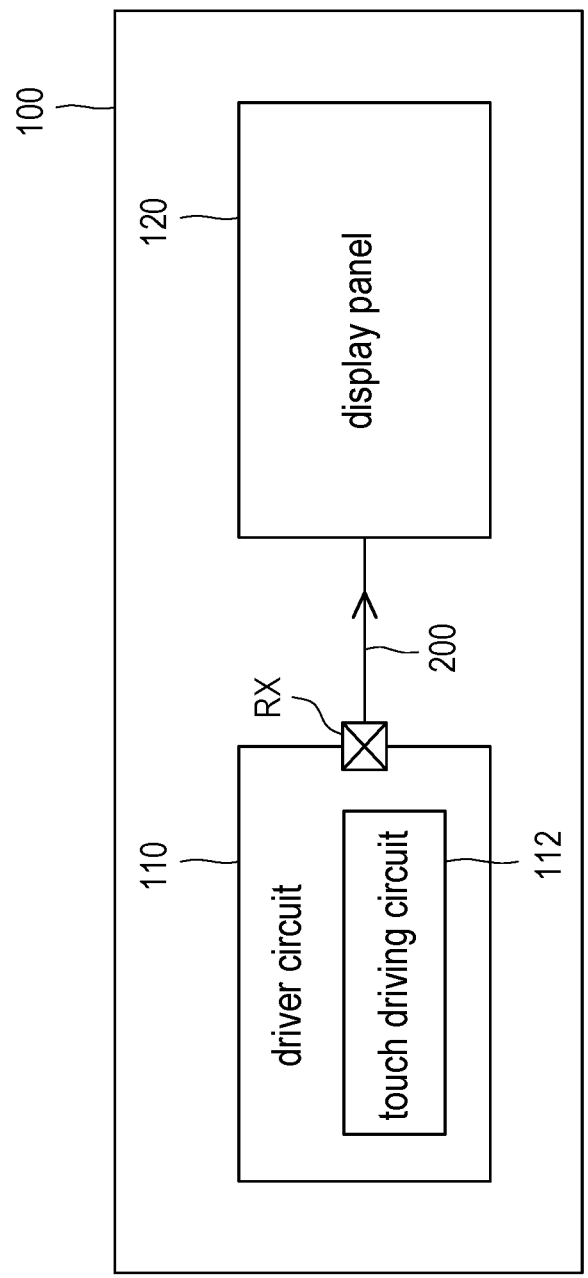
FIG. 1 is a block diagram illustrating an electronic apparatus according to an embodiment of the disclosure.
Figure 2:
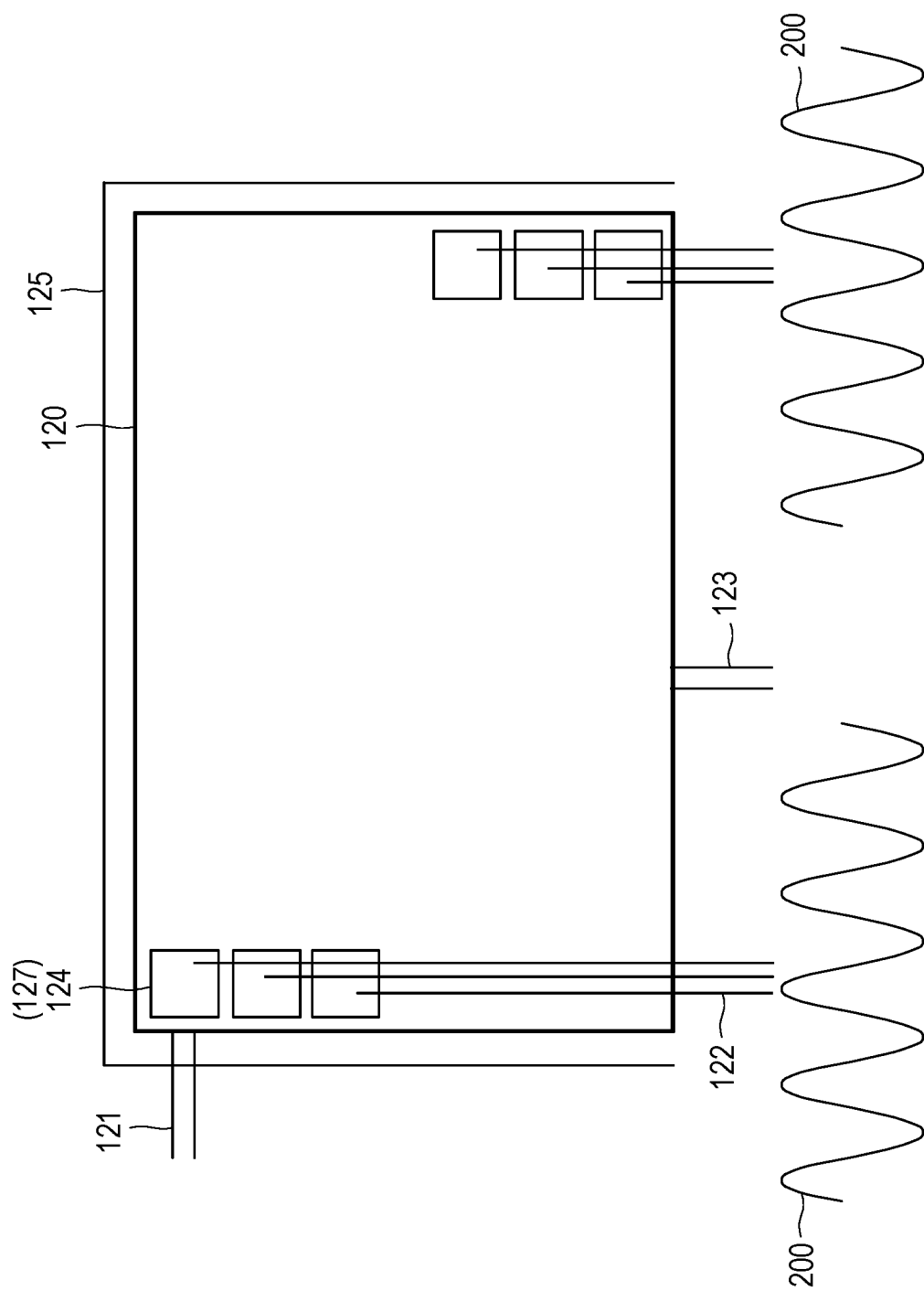
FIG. 2 is a schematic diagram illustrating the display panel of FIG. 1 according to an embodiment of the disclosure.

FIG. 1 is a block diagram illustrating an electronic apparatus according to an embodiment of the disclosure. FIG. 2 is a schematic diagram illustrating the display panel of FIG. 1 according to an embodiment of the disclosure. Referring to FIG. 1 and FIG. 2, the electronic device 100 includes a driver circuit 110 and a display panel 120. In an embodiment, the driver circuit 110 may be an integrated circuit chip (IC chip) that can drive the display panel 120 to perform a display function, a touch sensing function and/or a fingerprint sensing function.

The display panel 120 includes touch sensing lines 122, touch sensors 124, gate lines 121, source lines 123, or a guard ring 125. The touch sensing lines 122 is coupled to the touch sensors 124. The display panel 120 may also include other elements or devices, e.g. pixel circuits or fingerprint sensors, to perform the display function, the touch sensing function and/or the fingerprint sensing function. For conciseness, the other elements or devices are not illustrated in FIG. 2.

The driver circuit 110 drives and controls the touch sensors 124 to sense a touch event of the display panel 120 via touch scan lines and touch sensing lines 122. In the present embodiment, in-cell touch sensors are taken as an example, but the disclosure is not limited thereto. For the in-cell touch sensors, the touch sensors 124 may be touch sensing electrodes in a touch sensing phase, and the touch sensors 124 may be common electrodes 127 in a display phase. The display panel 120 including the in-cell touch sensors inherently has no touch scan lines. For other type touch sensors, the display panel 120 may have touch scan lines for transmitting touch driving signals.

The driver circuit 110 includes a touch driving circuit 112. The touch driving circuit 112 is configured to output a synchronization driving signal 200 to specified devices of the display panel 120 in the touch sensing phase. The specified devices may include the touch sensing lines 122, the common electrodes 127, the gate lines 121, the source lines 123, and/or the guard ring 125 of the display panel 120. In the touch sensing phase, the synchronization driving signal 200 is applied to the touch sensing lines 122, the common electrodes 127, the gate lines 121, the source lines 123, and the guard ring 125 for loading free driving (LFD). The synchronization driving signal 200 has the same frequency, phase and amplitude as the touch driving signal that is applied to the touch sensors 124 of the display panel 120 in the touch sensing phase.

Figure 3:
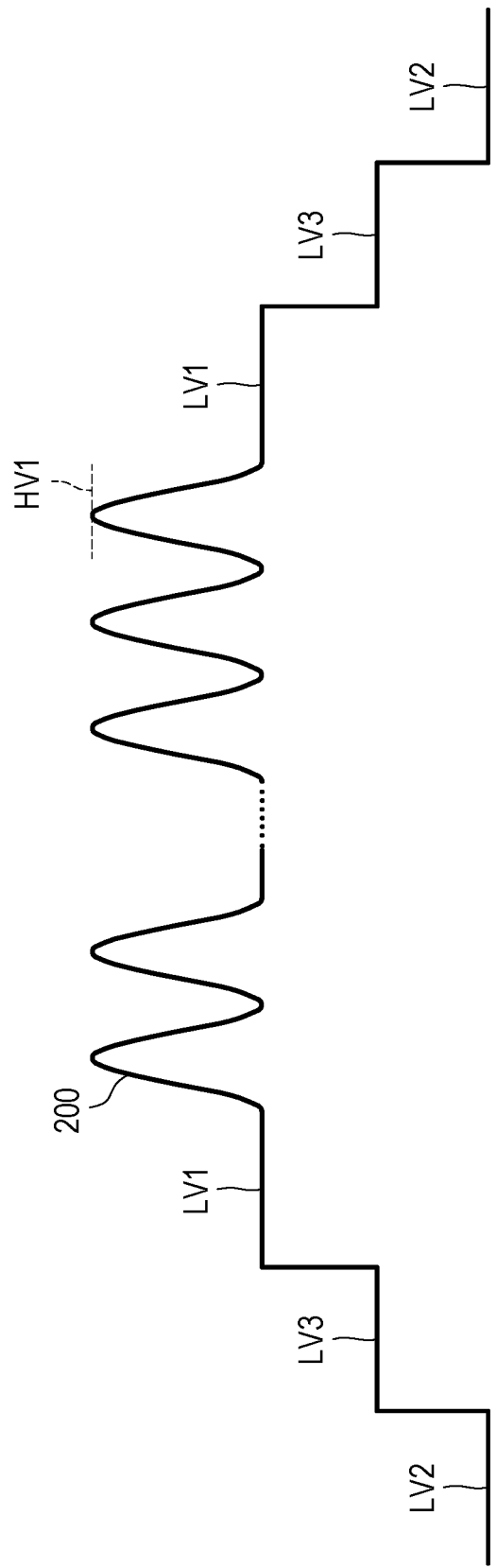
FIG. 3 is a waveform diagram of the synchronization driving signal according to an embodiment of the disclosure.

FIG. 3 is a waveform diagram of the synchronization driving signal according to an embodiment of the disclosure. Referring to FIG. 1 to FIG. 3, the synchronization driving signal 200 may be outputted to the display panel 120 via a pad RX of the driver circuit 110. The synchronization driving signal 200 may be a sine wave or a square wave, and the sine wave is taken for example in the present embodiment. The synchronization driving signal 200 includes a high level HV1 and a low level LV1 (a first level). The synchronization driving signal 200 is transmitted from the driver circuit 110 to the display panel 120 via the pad RX. A touch sensing signal of the touch sensors 124 may be also transmitted from the display panel 120 to the driver circuit 110 via the same pad RX. For conciseness, only one pad RX is illustrated in FIG. 1, but the number of the pad RX does not intend to limit the disclosure.

Taking the common electrode 127 for example, the touch sensor 124 serves as a common electrode in the display phase, and has a second level LV2. The second level LV2 may be a common voltage for reference in the display phase. In the touch sensing phase, the touch sensor 124 serves as a touch sensing electrode, and a touch driving signal, which can be deemed the same as the synchronization driving signal 200, is applied. Therefore, for voltage rising stage, a voltage level of the common electrode 127 is changed from the second level LV2 to the first level LV1. The second level LV2 is smaller than the first level LV1.

In the present embodiment, in the display phase, the touch sensor 124 serving as the common electrode 127 operates in a negative voltage domain, and in the touch sensing phase, the touch sensor 124 serving as the touch sensing electrode operates in a positive voltage domain. Therefore, the first level is a positive voltage, and the second level is a negative voltage. The voltage level of the common electrode 127 may be changed from the second level LV2 to a third level LV3 first and then from the third level LV3 to the first level LV1. The third level LV3 is larger than the second level LV2 and smaller than the first level LV1. The third level LV3 may be a ground voltage, for example.

On the other hand, for voltage falling stage, the voltage level of the common electrode 127 is changed from the first level LV1 to the second level LV2. The voltage level of the common electrode 127 is changed from the first level LV1 to the third level LV3 first and then from the third level LV3 to the second level LV2.

Figure 4:
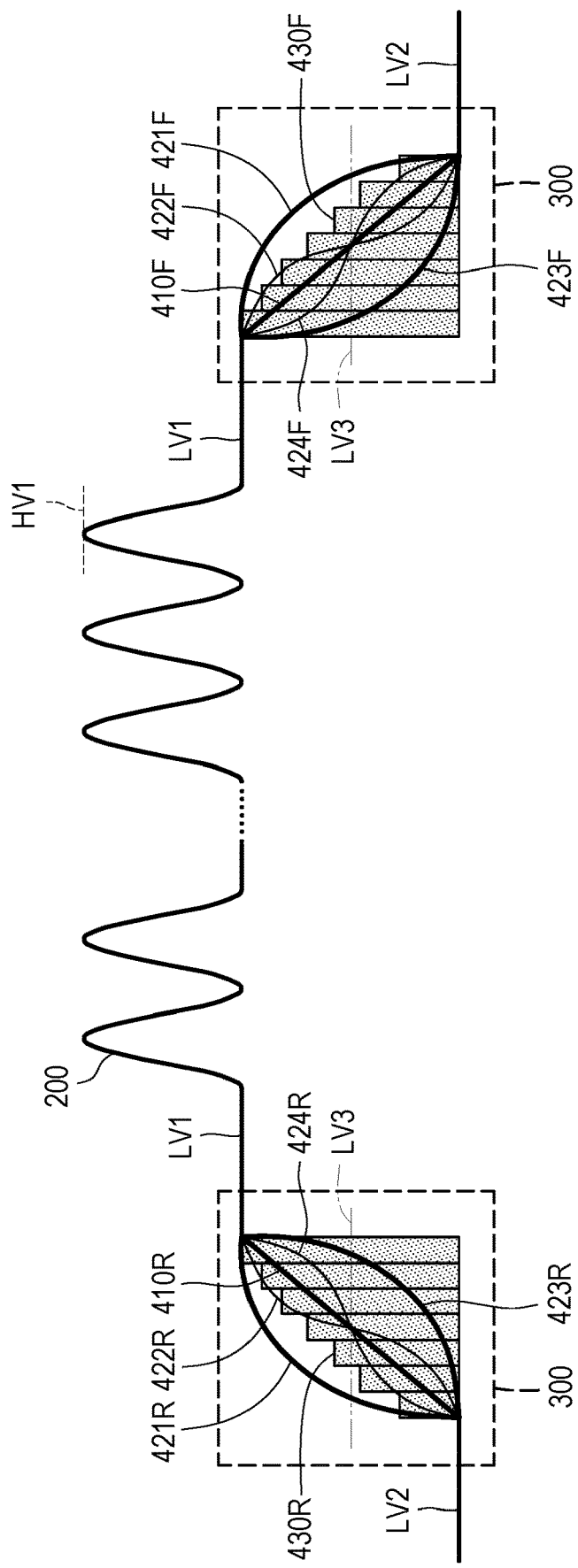
FIG. 4 is a waveform diagram of the synchronization driving signal according to another embodiment of the disclosure.

FIG. 4 is a waveform diagram of the synchronization driving signal according to another embodiment of the disclosure. Referring to FIG. 4, in the present embodiment, for voltage rising stage, the voltage level of the common electrode 127 is changed in a manner of step-rising, linear-rising or nonlinear-rising to reduce electromagnetic interference (EMI) effect. For voltage falling stage, the voltage level of the common electrode 127 is changed in a manner of step-falling, linear-falling or nonlinear-falling to reduce EMI effect.

To be specific, for voltage rising stage, the voltage level of the common electrode 127 is changed with a first slew rate in a straight line 410R, i.e. a linear-rising manner. The first slew rate is larger than 0 voltage per microsecond (V/us) and smaller than 0.5 V/us. That is, 0 V/us<SR1<0.5 V/us, wherein SR1 is the first slew rate. The voltage level of the common electrode 127 may also be changed in curves 421R, 422R, 423R or 424R, i.e. a nonlinear-rising manner. The equivalent slew rate of the nonlinear-rising manner is larger than 0 V/us and smaller than 0.5 V/us. In addition, the voltage level of the common electrode 127 may also be changed step by step as illustrated in mark 430R, i.e. a step-rising manner. The equivalent slew rate of the step-rising manner is larger than 0 V/us and smaller than 0.5 V/us.

For voltage falling stage, the voltage level of the common electrode 127 is changed with a second slew rate in a straight line 410F, i.e. a linear-falling manner. The second slew rate is smaller than 0 V/us and larger than −0.5 V/us. That is, −0.5 V/us<SR2<0 V/us, wherein SR2 is the second slew rate. The voltage level of the common electrode 127 may also be changed in curves 421F, 422F, 423F or 424F, i.e. a nonlinear-falling manner. The equivalent slew rate of the nonlinear-falling manner is smaller than 0 V/us and larger than −0.5 V/us. In addition, the voltage level of the common electrode 127 may also be changed step by step as illustrated in mark 430F, i.e. a step-falling manner. The equivalent slew rate of the step-falling manner is smaller than 0 V/us and larger than−0.5 V/us.

Figure 5:
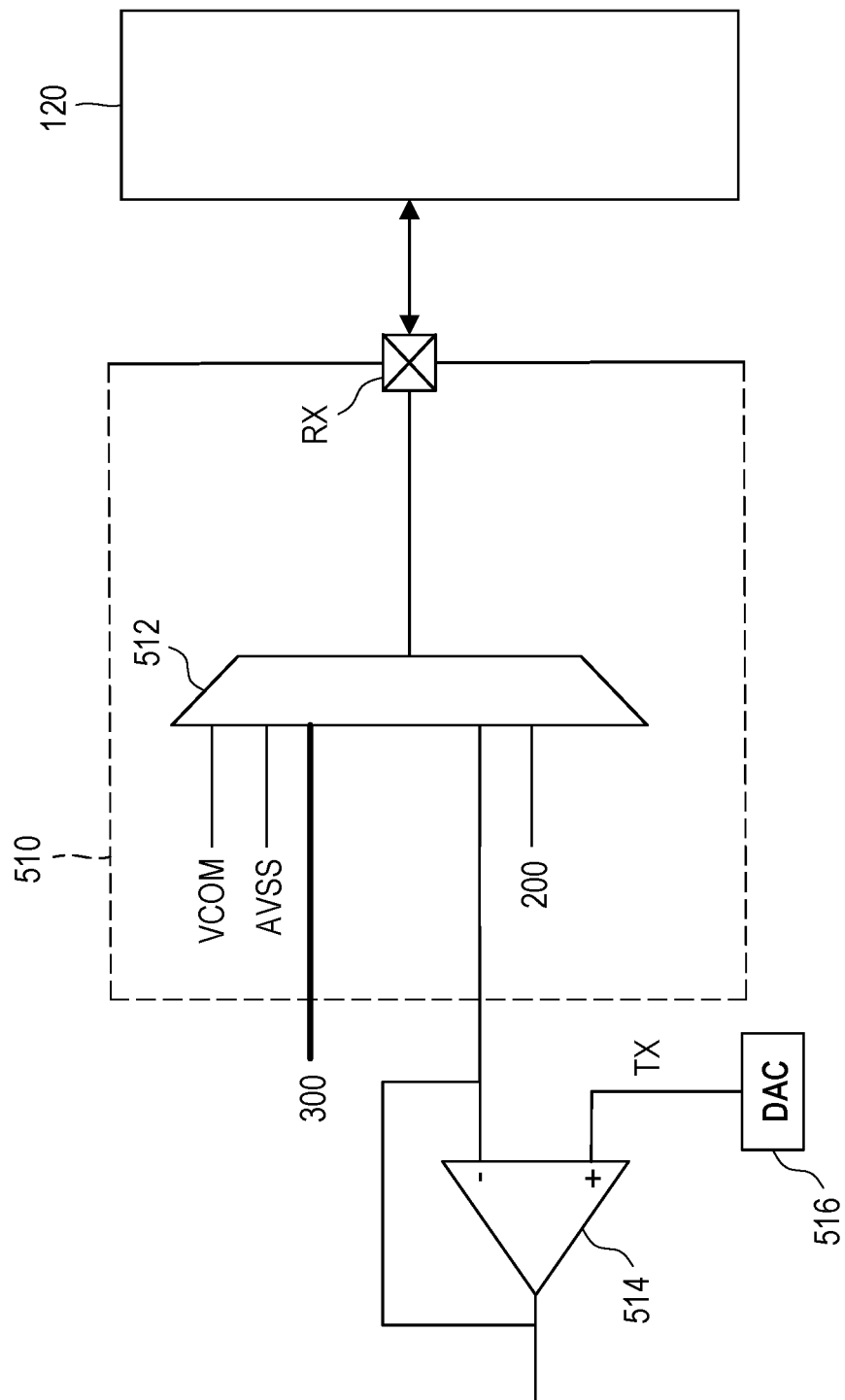
FIG. 5 is a circuit diagram illustrating a driver circuit according to an embodiment of the disclosure.

FIG. 5 is a circuit diagram illustrating a driver circuit according to an embodiment of the disclosure. Referring to FIG. 5, the driver circuit 510 includes a pad RX, a multiplex circuit 512, a sensing circuit 514 and a digital-to-analog converter (DAC) circuit 516. The pad RX is coupled to the display panel 120. The multiplex circuit 512 is an input and output (I/O) multiplexer that can receive and output signals through the pad RX. The pad RX may be coupled to the touch sensing lines 122, the touch sensors 124, the common electrodes 127, the gate lines 121, the source lines 123, or the guard ring 125.

In the touch sensing phase, the DAC circuit 516 outputs a touch driving signal TX, and the touch driving signal TX is transmitted to the multiplex circuit 512 through virtual short property of amplifier. The multiplex circuit 512 outputs the touch driving signal TX to the touch sensors 124 of the display panel 120 via the pad RX. Next, the touch sensing signal from the touch sensors 124 are transmitted to the sensing circuit 514 via the pad RX and the multiplex circuit 512.

On the other hand, the multiplex circuit 512 is configured to receive a synchronization driving signal 200, a common signal VCOM, a level transition signal 300, and a system voltage signal AVSS. In an embodiment, the touch driving signal TX and the synchronization driving signal 200 may be from the same signal source. The multiplex circuit 512 outputs one of the synchronization driving signal 200, the common signal VCOM, the level transition signal 300, and the system voltage signal AVSS to the pad RX in the touch sensing phase.

Referring to FIG. 4 again, the synchronization driving signal 200 has the first level LV1, the common signal VCOM has the second level LV2, and the system voltage signal AVSS has the third level LV3. In addition, FIG. 4 also illustrates a waveform of the level transition signal 300. Taking the pad RX coupled to the touch sensor 124 for example, the touch sensors 124 may be the touch sensing electrode in the touch sensing phase, and the touch sensor 124 may be the common electrode 127 in the display phase. When the multiplex circuit 512 outputs the common signal VCOM, the level transition signal 300, the system voltage signal AVSS and the synchronization driving signal 200 to the pad RX in the touch sensing phase, a voltage level of the pad RX is changed from the second level LV2 to the first level LV1 through the third level LV3 according to the waveform of the level transition signal 300.

As illustrated in FIG. 4, the level transition signal 300 may increase in the manner of step-rising, linear-rising or nonlinear-rising or decrease in the manner of step-falling, linear-falling or nonlinear-falling. Therefore, the voltage level of the pad RX is changed in the same manner as the level transition signal 300 in the voltage rising state or the voltage falling state. That is, the voltage level of the pad RX increases in the manner of step-rising, linear-rising or nonlinear-rising or decreases in the manner of step-falling, linear-falling or nonlinear-falling.

Figure 6A:
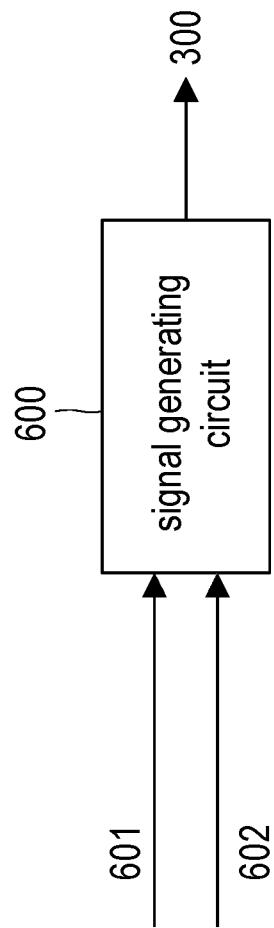
FIG. 6A is a block diagram illustrating a signal generating circuit according to an embodiment of the disclosure.
Figure 6B:
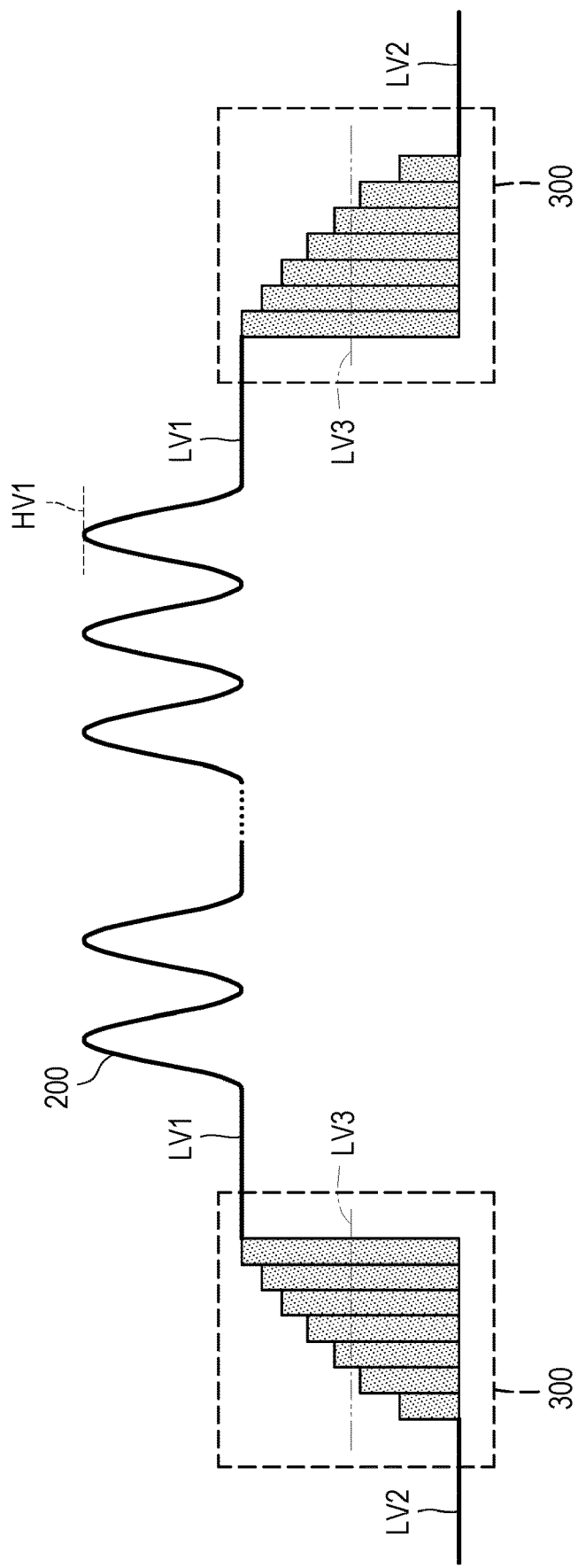
FIG. 6B is a waveform diagram of the level transition signal of FIG. 6A according to an embodiment of the disclosure.

FIG. 6A is a block diagram illustrating a signal generating circuit according to an embodiment of the disclosure. FIG. 6B is a waveform diagram of the level transition signal of FIG. 6A according to an embodiment of the disclosure.

Referring to FIG. 5, FIG. 6A, and FIG. 6B, the driver circuit 510 may further include the signal generating circuit 600.

In the present embodiment, the signal generating circuit 600 generates the level transition signal 300 according to a voltage selecting signal 601 and a timing selecting signal 602. The level transition signal 300 is generated and outputted to the multiplex circuit 512. The generated level transition signal 300 changes in the manner of step-rising or step-falling as illustrated in FIG. 6B. The voltage selecting signal 601 and the timing selecting signal 602 may be from a touch controller or a timing controller.

Figure 7:
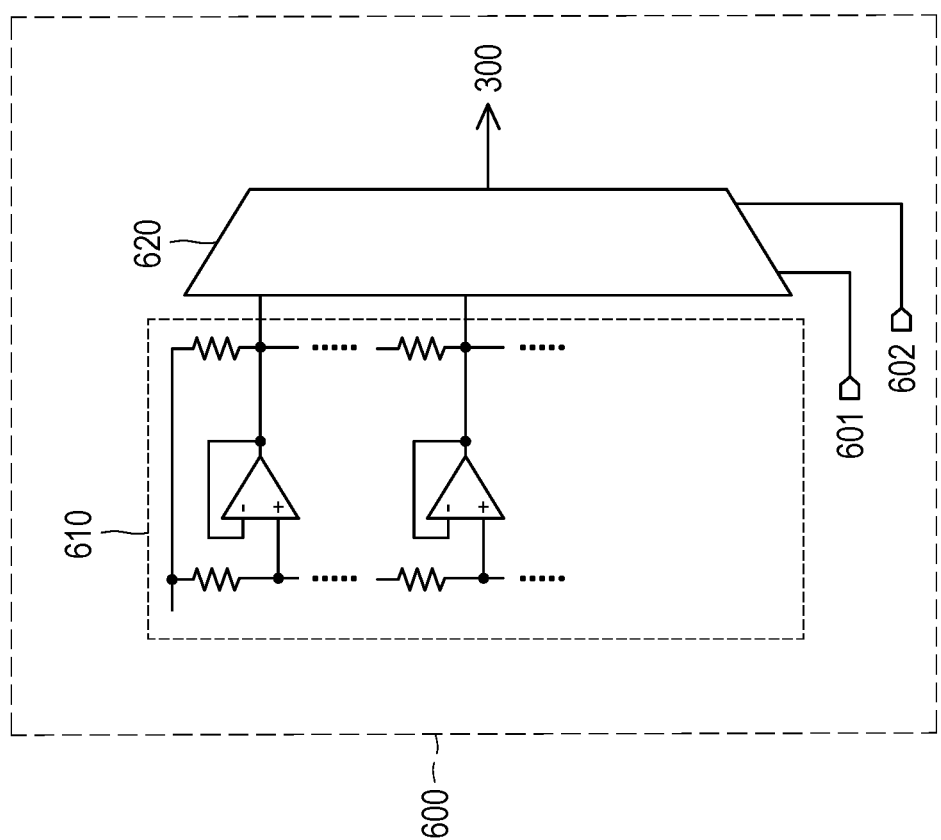
FIG. 7 is a circuit diagram illustrating the signal generating circuit of FIG. 6A according to an embodiment of the disclosure.

FIG. 7 is a circuit diagram illustrating the signal generating circuit of FIG. 6A according to an embodiment of the disclosure. Referring to FIG. 7, the signal generating circuit 600 includes a voltage dividing circuit 610 and a multiplex circuit 620. The voltage dividing circuit 610 includes resistor strings and buffers to generate a plurality of voltages. The multiplex circuit 620 outputs specified voltages at specified times to serve as the level transition signal 300 according to the voltage selecting signal 601 and the timing selecting signal 602.

Figure 8B:
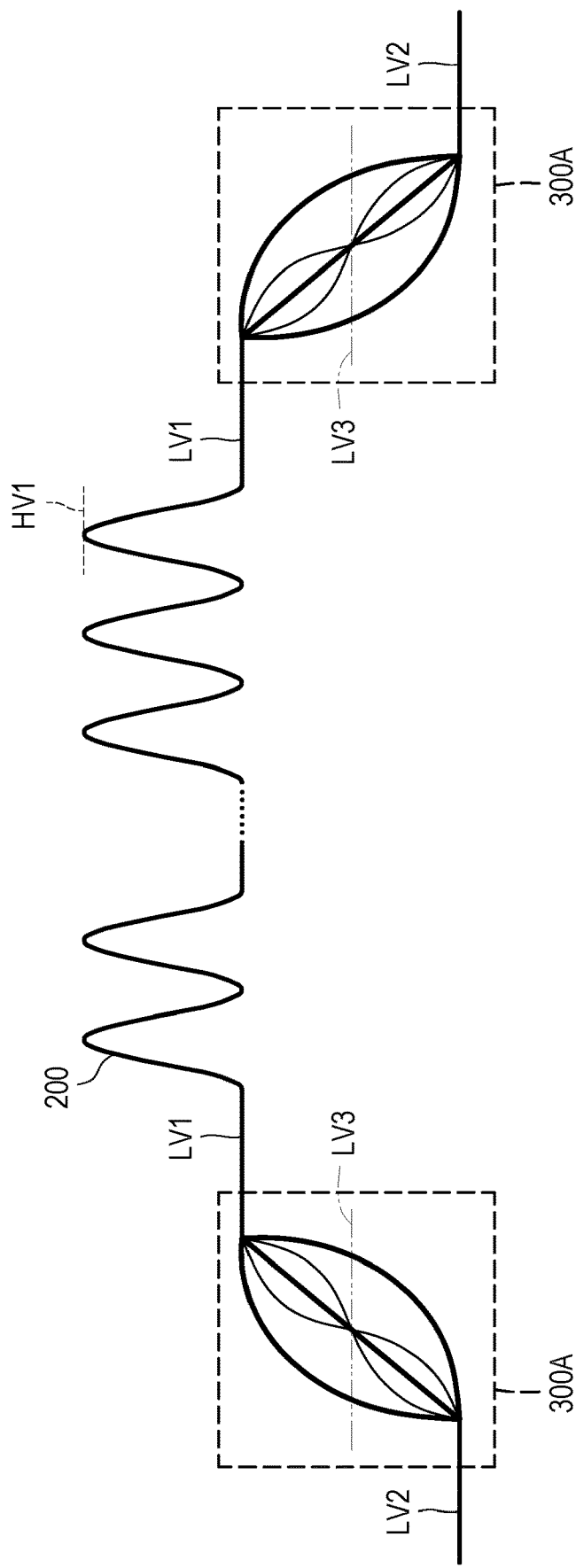
FIG. 8B is a waveform diagram of the level transition signal of FIG. 8A according to an embodiment of the disclosure.
Figure 9C:
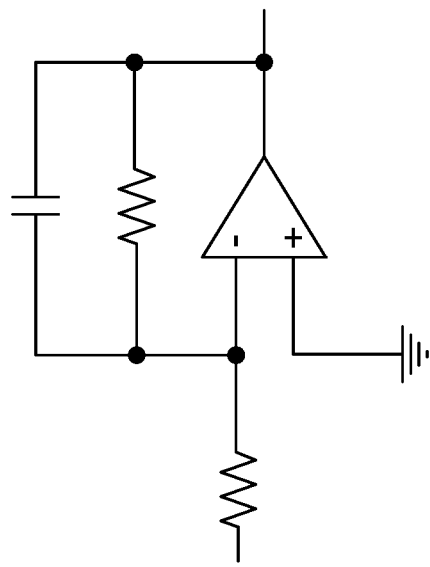
FIG. 9A, FIG. 9B and FIG. 9C are circuit diagrams respectively illustrating the processing circuit of FIG. 8A according to embodiments of the disclosure.
Figure 9B:
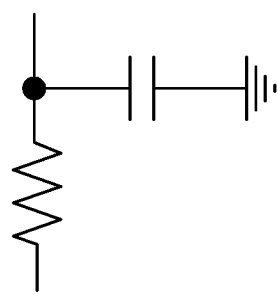
Figure 9A:
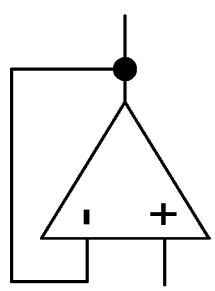

FIG. 8A is a block diagram illustrating a signal generating circuit and a processing circuit according to an embodiment of the disclosure. FIG. 8B is a waveform diagram of the level transition signal of FIG. 8A according to an embodiment of the disclosure. FIG. 9A, FIG. 9B and FIG. 9C are circuit diagrams respectively illustrating the processing circuit of FIG. 8A according to embodiments of the disclosure.

Referring to FIG. 5 and FIG. 8A to FIG. 9C, the driver circuit 510 may further include the signal generating circuit 600 and the processing circuit 700. In the present embodiment, the level transition signal 300 generated by the signal generating circuit 600 is outputted to the processing circuit 700. The processing circuit 700 may be a slew rate controller or a filter circuit as illustrated in FIG. 9A, FIG. 9B and FIG. 9C. FIG. 9A illustrates a slew rate controller with an amplifier. FIG. 9B illustrates a first order RC filter. FIG. 9C illustrates a high order filter with an amplifier. The level transition signal 300 is processed by the processing circuit 700 to become smoother, and thus the processing circuit 700 outputs a level transition signal 300A. The level transition signal 300A changes in the manner of linear-rising, linear-falling, nonlinear-rising or nonlinear-falling as illustrated in FIG. 8B.

In the above embodiments, level transition of common electrodes are taken as an example for description, level transition of other devices, such as touch sensing lines, gate lines, source lines, or a guard ring, can be deduced in similar manners.

In the disclosure, level transition of specified devices can also be achieved by conducting switches in different times, and it will be described as follows.

Returning to FIG. 3 again, in FIG. 3, when the electronic device 100 enters the touch sensing phase, the synchronization driving signal 200 would be applied to the pad RX, and the voltage level of the pad RX may increase from the second level LV2 to the third level LV3 first and then from the third level LV3 to the first level LV1. At the end of the touch sensing phase, the voltage level of the pad RX may decrease from the first level LV1 to the third level LV3 first and then from the third level LV3 to the second level LV2.

Figure 10:
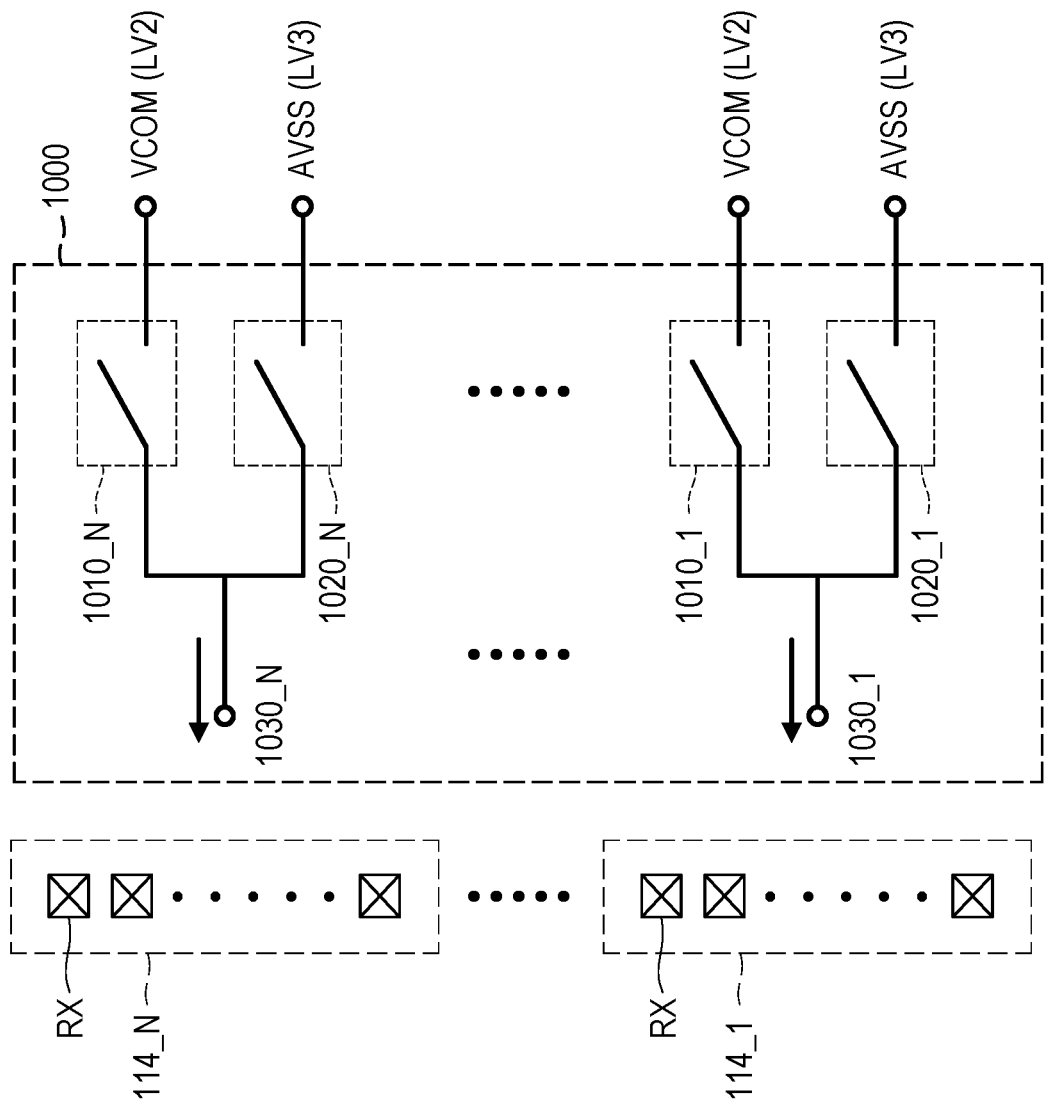
FIG. 10 is a circuit diagram illustrating a switch circuit according to an embodiment of the disclosure.
Figure 11:
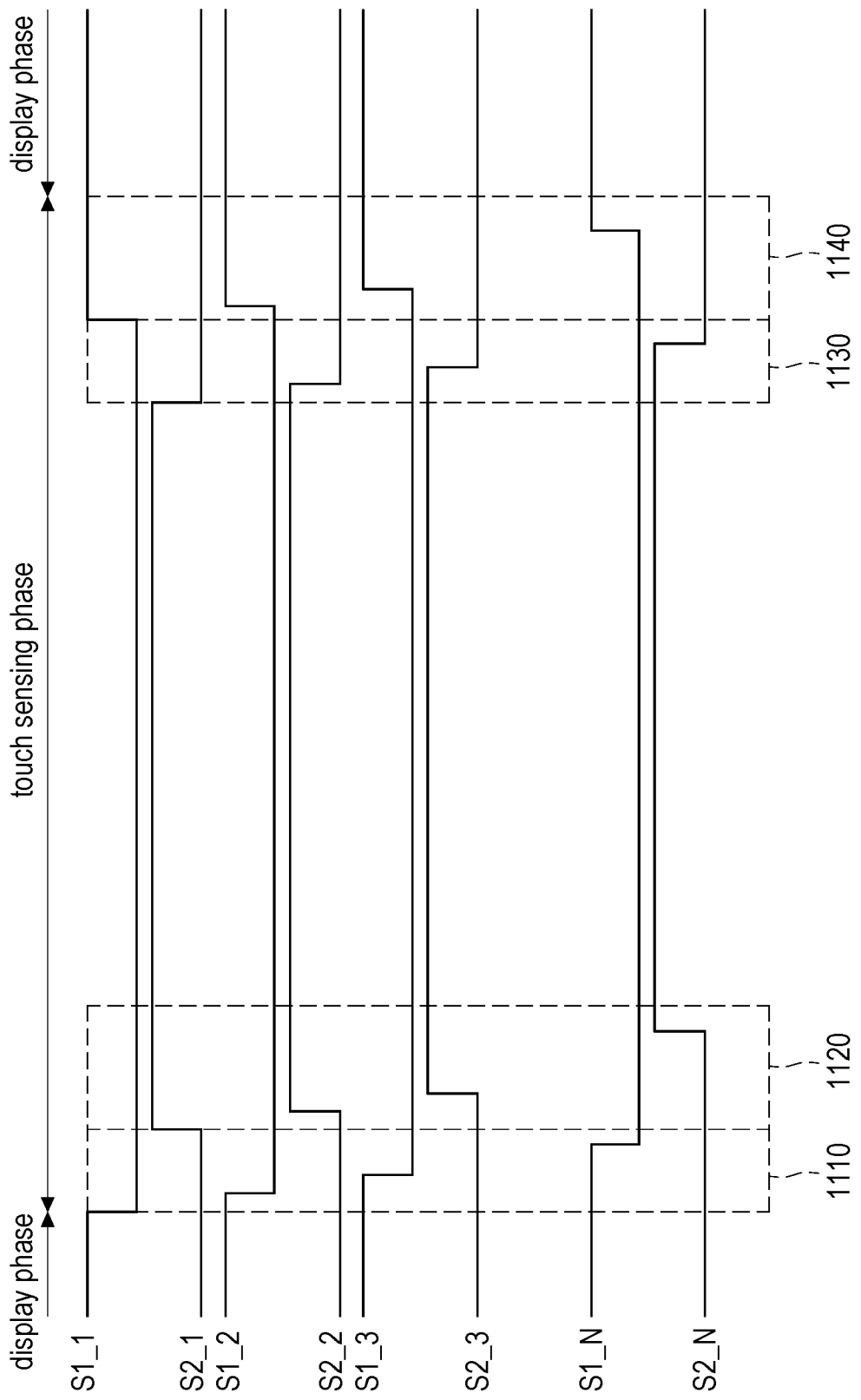
FIG. 11 is a waveform diagram illustrating control signals of the switch circuit depicted in FIG. 10 according to an embodiment of the disclosure.

FIG. 10 is a circuit diagram illustrating a switch circuit according to an embodiment of the disclosure. FIG. 11 is a waveform diagram illustrating control signals of the switch circuit depicted in FIG. 10 according to an embodiment of the disclosure. Referring to FIG. 10 and FIG. 11, the driver circuit 110 may include the switch circuit 1000 and a plurality of pads RX. The pads RX are grouped into several pad groups 114_1 to 114_N, wherein N is a positive integer larger than 1. The pad groups 114_1 to 114_N are coupled to the touch sensing lines 122, the touch sensors 124, the common electrodes 127, the gate lines 121, the source lines 123, or the guard ring 125. Each of the pad groups 114_1 to 114_N includes the specified number of the pads RX. In FIG. 10 and FIG. 11, the pads RX are grouped into 12 pad groups, i.e. N=12, but the disclosure is not limited thereto.

The switch circuit 1000 is configured to receive the common signal VCOM and the system voltage signal AVSS and output the common signal VCOM and the system voltage signal AVSS to the corresponding pad groups 114_1 to 114_N in a time division manner. The common signal VCOM and the system voltage signal AVSS may have the second level LV2 and the third level LV3, respectively.

To be specific, the switch circuit 1000 includes a plurality of first switches 1010_1 to 1010_N, a plurality of second switches 1020_1 to 1020_N, and a plurality of output terminals 1030_1 to 1030_N. The output terminals 1030_1 to 1030_N are connected to the corresponding pad groups 114_1 to 114_N. The first switches 1010_1 to 1010_N are configured to receive the common signals VCOM, and output the common signals VCOM to the pad groups 114_1 to 114_N when the first switches 1010_1 to 1010_N are conducted. The second switches 1020_1 to 1020_N are configured to receive the system voltage signals AVSS, and output the system voltage signals AVSS to the pad groups 114_1 to 114_N when the second switches 1020_1 to 1020_N are conducted.

Conduction states of the first switches 1010_1 to 1010_N are controlled by control signals S1_1 to S1_N, and conduction states of the second switches 1020_1 to 1020_N are controlled by control signals S2_1 to S2_N. Taking the first switch 1010_N and the second switch 1020_N for example, when the first switch 1010_N is conducted according to the control signal S1_N, the common signal VCOM is outputted to the pad group 114_N via the output terminal 1030_N. On the other hand, when the second switch 1020_N is conducted according to the control signal S2_N, the system voltage signal AVSS is outputted to the same pad group 114_N via the same output terminal 1030_N. The first switch 1010_N and the second switch 1020_N are not conducted at the same time.

In FIG. 11, the dotted blocks 1110 and 1140 indicate that the control signals S1_1, S1_2, S1_3 to S1_N sequentially conduct corresponding first switches 1010_1 to 1010_N in different times. The first switches 1010_1 to 1010_N are sequentially conducted. The dotted blocks 1120 and 1130 indicate that the control signals S2_1, S2_2, S2_3 to S2_N sequentially conduct corresponding second switches 1020_1 to 1020_N in different times. The second switches 1020_1 to 1020_N are sequentially conducted. Therefore, the switch circuit 1000 can output the common signal VCOM and the system voltage signal AVSS to the corresponding pad groups 114_1 to 114_N in the time division manner.

Therefore, for voltage rising stage, the voltage levels of the pad groups 114_1 to 114_N can be changed from the second level LV2 to the first level LV1 through the third level LV3 in different times. Similarly, for voltage falling stage, the voltage levels of the pad groups 114_1 to 114_N can also be changed from the first level LV1 to the second level LV2 through the third level LV3 in different times.

In the related art, all switches for transmitting signals are conducted at the same time, and thus serious EMI effect will happen. However, in the present embodiment, since the first switches 1010_1 to 1010_N and the second switches 1020_1 to 1020_N are conducted in different times, EMI effect is reduced.

Figure 12:
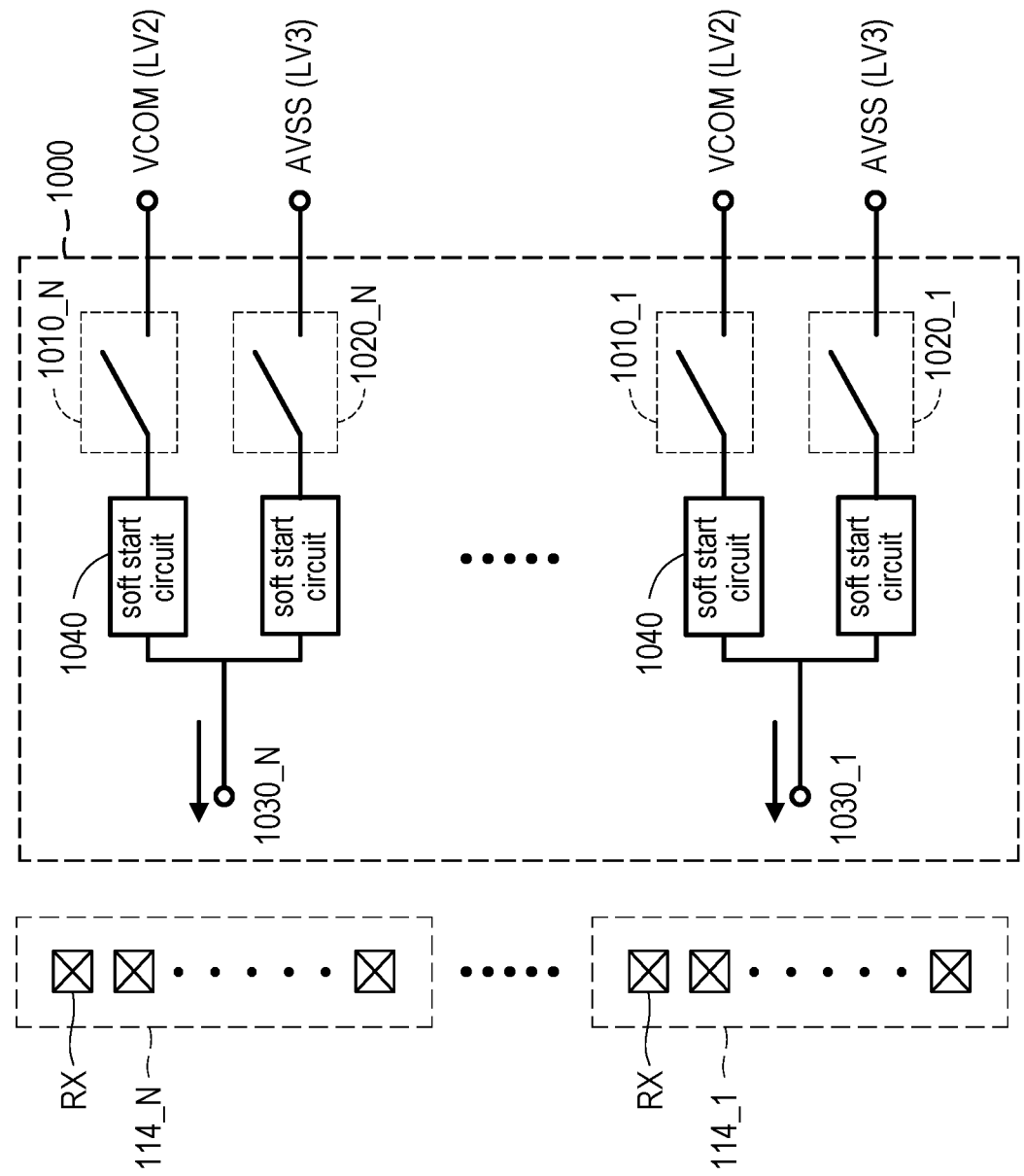
FIG. 12 is a circuit diagram illustrating a switch circuit according to another embodiment of the disclosure.

FIG. 12 is a circuit diagram illustrating a switch circuit according to another embodiment of the disclosure. Referring to FIG. 12, the switch circuit 1200 of the present embodiment is similar to the switch circuit 1000 of FIG. 10, and the main difference therebetween, for example, lies in that the switch circuit 1200 further includes a plurality of soft start circuits 1040. The soft start circuits 1040 are disposed after the first switches 1010_1 to 1010_N and the second switches 1020_1 to 1020_N and configured to reduce the steepness of the voltage rise/fall and reduce the inrush current. Each of the soft start circuits 1040 may include a resistor string that a plurality of resistors are coupled in series.

In summary, in the disclosure, voltage transition between the second level and the first level can be done by digital type (FIG. 6A) or analog type (FIG. 8A). The voltage conversion process includes digital ladder type (step-rising or step-falling), diagonal line, index type, slow and then fast . . . etc. The voltage transition between the second level and the first level can be defined by the slew rate. According to circuit simulation and actual test, as long as the slew rate of any section in the voltage transition interval is within the specified range, e.g. 0 V/us<SR1<0.5 V/us or −0.5 V/us<SR2<0 V/us, the EMI effect can be reduced. On the other hand, in a case of transition by using multiple switches, for the voltage transition between the second level and the first level, multiple switches switching in groups and at different times can also reduce the EMI effect and the inrush current.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver circuit, configured to drive a display panel to perform a display function and a touch function, the driver circuit comprising:
    a plurality of pads, coupled to the display panel and grouped into several pad groups, wherein a synchronization driving signal is applied to the pad groups in a touch sensing phase, and the synchronization driving signal has a first level; and
    a switch circuit, coupled to the pads and configured to receive a common signal and a system voltage signal, and output the common signal and the system voltage signal to the pad groups in a time division manner, wherein the common signal has a second level, and the system voltage signal has a third level,
    wherein voltage levels of the pad groups are changed from the second level to the first level in different times, and the second level is smaller than the first level,
    wherein the switch circuit comprises:
    a plurality of first switches, configured to receive the common signals, and output the common signals to the pad groups when the first switches are conducted; and
    a plurality of second switches, configured to receive the system voltage signals, and output the system voltage signals to the pad groups when the second switches are conducted,
    wherein when the display panel enters a touch sensing phase, the first switches are sequentially conducted first, and then the second switches are sequentially conducted after the first switches are sequentially conducted; and when the display panel prepares to leave the touch sensing phase, the second switches are sequentially conducted first, and then the first switches are sequentially conducted after the second switches are sequentially conducted.

2. The driver circuit of claim 1, wherein the voltage levels of the pad groups are changed from the second level to the first level through the third level in different times, and the third level is larger than the second level and smaller than the first level.

3. The driver circuit of claim 1, wherein the voltage levels of the pad groups are changed from the first level to the second level in different times.

4. The driver circuit of claim 3, wherein the voltage levels of the pad groups are changed from the first level to the second level through the third level in different times, and the third level is larger than the second level and smaller than the first level.

5. The driver circuit of claim 1, wherein the first level is a positive voltage, the second level is a negative voltage, and the third level is a ground voltage.

6. The driver circuit of claim 1, wherein the pad groups are coupled to touch sensing lines, gate lines, source lines, common electrodes, or a guard ring of the display panel.

\* \* \* \* \*